United States Patent
Bhaduri et al.

(10) Patent No.: US 6,841,633 B2
(45) Date of Patent: Jan. 11, 2005

(54) LOWER α-ALKENE POLYMERIZATION HETEROGENEOUS SOLID CATALYST

(75) Inventors: Sumit Bhaduri, Maharashtra (IN); Virendra Kumar Gupta, Maharashtra (IN)

(73) Assignee: Reliance Industries Limited, Mumbai (IN)

(*) Notice: Subject to any disclaimer, the term of this patent is extended or adjusted under 35 U.S.C. 154(b) by 191 days.

(21) Appl. No.: 10/110,045

(22) PCT Filed: Nov. 29, 2000

(86) PCT No.: PCT/IN00/00114

§ 371 (c)(1),
(2), (4) Date: Apr. 5, 2002

(87) PCT Pub. No.: WO02/44220

PCT Pub. Date: Jun. 6, 2002

(65) Prior Publication Data

US 2002/0183194 A1 Dec. 5, 2002

(51) Int. Cl.[7] .................................................. C08F 4/42
(52) U.S. Cl. ................. 526/142; 526/124.2; 526/124.3; 502/127; 502/103; 502/107; 502/125; 502/128; 502/115
(58) Field of Search ............................. 526/142, 124.2, 526/124.3; 502/103, 107, 125, 128, 115, 127

(56) References Cited

U.S. PATENT DOCUMENTS

| | | | |
|---|---|---|---|
| 4,329,253 A | 5/1982 | Goodall et al. | 252/429 |
| 4,393,182 A | 7/1983 | Goodall et al. | 526/125 |
| 4,400,302 A | 8/1983 | Goodall et al. | 252/429 |
| 4,401,589 A | 8/1983 | Kioka et al. | 252/429 |
| 4,414,132 A | 11/1983 | Goodall et al. | 502/169 |
| 4,419,501 A | 12/1983 | Goodall et al. | 526/122 |
| 4,477,639 A | 10/1984 | Nielsen | 526/124 |
| 4,497,905 A | 2/1985 | Nozaki | 502/107 |
| 4,535,068 A | 8/1985 | Job | 502/107 |
| 4,657,995 A | 4/1987 | Job | 526/124 |
| 4,710,482 A | 12/1987 | Job | 502/127 |
| 4,728,705 A | 3/1988 | Nestlerode et al. | 526/125 |
| 4,761,461 A | 8/1988 | Jaggard et al. | 526/125 |
| 4,771,024 A | 9/1988 | Nestlerode et al. | 502/107 |
| 4,801,672 A | 1/1989 | Kohyama et al. | 526/348 |
| 4,804,648 A | 2/1989 | Job | 502/119 |
| 4,853,444 A | 8/1989 | Inkrott et al. | 526/119 |
| 4,870,039 A | 9/1989 | Job | 502/104 |
| 4,870,040 A | 9/1989 | Job | 502/104 |
| 4,914,069 A | 4/1990 | Job et al. | 502/107 |
| 4,948,770 A * | 8/1990 | Job | 502/107 |
| 5,015,612 A | 5/1991 | Kioka et al. | 502/133 |
| 5,066,737 A | 11/1991 | Job | 526/119 |
| 5,077,357 A | 12/1991 | Job | 526/119 |
| 5,082,907 A | 1/1992 | Job | 526/119 |
| 5,106,806 A | 4/1992 | Job | 502/111 |
| 5,122,494 A | 6/1992 | Job | 502/125 |
| 5,124,298 A | 6/1992 | Job | 502/127 |
| 5,141,910 A | 8/1992 | Job | 502/127 |
| 5,151,399 A | 9/1992 | Job | 502/127 |
| 5,229,342 A | 7/1993 | Job | 502/127 |
| 5,234,879 A | 8/1993 | Garoff et al. | 502/107 |
| 5,731,393 A | 3/1998 | Kojoh et al. | 526/124.8 |

FOREIGN PATENT DOCUMENTS

| | | |
|---|---|---|
| EP | 0 360 491 A2 | 3/1990 |
| EP | 0 683 175 A2 * | 11/1995 |
| WO | 90/09402 | 8/1990 |
| WO | 92/19658 | 11/1992 |
| WO | WO 92/19658 * | 11/1992 |

OTHER PUBLICATIONS

Noto, V.D., et al., "Synthesis and Crystal Structure of the Titanium Tetrachloride–Ethyl Propionate Adduct", *Zeitschrift für Kristallographic*, vol. 194, pp. 267–272 (1991).

Sobota, P., et al., "Reactions of $TiCl_4$ with diesters, Crystal Structures of $[CH_2 (CO_2Et)_2Cl_4Ti]$ and $[C_2H_4 (CO_2CH_2CH_2OPh)_2Cl_4Ti]$", *Journal of Organometallic Chemistry*, vol. 443, pp. 85–91 (1993).

* cited by examiner

*Primary Examiner*—Ling-Siu Choi
(74) *Attorney, Agent, or Firm*—Ladas & Parry

(57) ABSTRACT

A lower α-alkene polymerization heterogeneous solid catalyst which comprises a hydrated magnesium chloride derived procatalyst, a cocatalyst comprising an organoaluminium compound and a selectivity control agent comprising an ester or ether. The procatalyst comprises a titanium tetrahalide supported on a magnesium chloride ester complex precursor. Magnesium chloride alcoholate is reacted with an activated carbonyl compound in the presence of a hydrocarbon and/or halohydrocarbon solvent to generate insitu an internal electron donor ester component of the precursor. The precursor is reacted with a titanium tetrahalide optionally in the presence of a hydrocarbon and/or halohydrocarbon solvent.

25 Claims, No Drawings

LOWER α-ALKENE POLYMERIZATION HETEROGENEOUS SOLID CATALYST

This invention also relates to a process for the preparation of the heterogeneous solid catalyst and a process for the polymerisation of a lower α-alkene using the heterogeneous solid catalyst.

BACKGROUND ART

Polymers of lower α-alkenes or olefins such as ethylene, propylene or 1-butene find applications in the manufacture of a variety of articles including plastic bags or sheets or automobile parts. Of particular interest in polymer production is polypropylene with a high degree of isotacticity i.e. the extent of orientation of the branched groups in the polymer in the same direction, which shows high crystallinity. The polymerisation involves reacting the lower α-alkene such as propylene with a catalyst under polymerisation conditions. The early polymerisation catalysts were of relatively low activity and the polymers formed contained significant amounts of the catalyst residues which had to be removed by deashing steps. The more recent alkene polymerisation catalysts are of two types viz the single site catalysts and the heterogeneous solid catalysts. The single site catalysts comprise metallocenes or co-ordination complexes of transition metals and a cocatalyst such as methyl alumino oxane. These catalysts show activity when used in solution.

Heterogeneous solid catalysts are the most commonly used catalysts, specially in the bulk production of polyethylene or polypropylene, due to their high activity. A heterogeneous solid catalyst comprises a procatalyst, a cocatalyst and a selectivity control agent. The cocatalyst may be an organoaluminium compound such as alkyl aluminium. The selectivity control agent may be an ester such as p-substituted benzoate or phthalate ester or an ether such as alkyl, alkoxy or aryl alkoxy silane. The physicochemical properties of the procatalyst plays a pivotal role in the overall performance of the catalyst, particularly in producing polymers of high isotacticity index. The procatalysts are synthesised by halogenation of an organomagnesium compound such as magnesium ethoxide with a halogenating agent such as titanium tetrahalide in a hydrocarbon or halohydrocarbon solvent such as toluene or chlorobenzene to form magnesium chloride. The magnesium chloride so obtained is reacted with titanium alkoxide or excess titanium tetrahalide, usually titanium tetrachloride in the presence of a hydrocarbon/halohydrocarbon solvent. To this an internal electron donor such as an ester, for example ethyl benzoate, is added simultaneously or sequentially to result in a procatalyst. (U.S. Pat. Nos. 4,535,068, 4,414,132, 4,400,302, 4,477,639, 4,497,905, 4,535,068, 4,657,995, 4,710,482, 4,728,705, 4,771,024, 4,804,648, 4,870,039, 4,914,069, 4,870,040, 5,066,737, 5,077,357, 5,106,806, 5,082,907, 5,122,494, 5,124,298, 5,141,910, 5,151,399 and 5,229,342). In most of the above processes employing organomagnesium compounds, halogenation is usually carried out with titanium tetrahalide itself, because of which these routes necessitate use of higher amounts of titanium reagents in the preparation of the procatalyst, thereby rendering these processes expensive. Besides, organomagnesium compounds such as magnesium alkoxides in the presence of titanium compounds may result in by-products. Since an ester as such is separately added to the reaction mixture, there are chances of the free ester being present, which will react with the titanium tetrahalide ["Reactions of titanium tetrachloride with diesters", J Organomet. Chem. (1993), 443(1), 85–91 by Sobota Piotr etal; "Synthesis and crystal structure of the titanium tetrachloride-ethyl propionate adduct", Z Kristallogr. (1991), 194 (3–4), 267–72]. This reaction is exothermic and generates by-products in the preparation of the procatalyst which may affect the performance/activity of the catalyst.

Procatalysts may also be prepared by a method comprising milling together anhydrous magnesium chloride, a titanium tetrahalide such as titanium tetrachloride and an internal electron donor such as an ester in a hydrocarbon or halohydrocarbon solution at ambient temperature to produce a precursor. The precursor is then reacted with titanium tetrahalide to produce the procatalyst (U.S. Pat. Nos. 4,329,253 and 4,393,182). In yet another method, anhydrous magnesium chloride is milled with an internal electron donor such as an ester to produce a precursor which is milled with titanium tetrahalide (U.S. Pat. No. 4,419,501). Anhydrous magnesium chloride used in the above methods is expensive and not readily available. Procatalysts formed by these physical methods when used in polymerisation reactions, may show poor selectivity and result in polymers with low isotacticity index. In this process also by-products formation due to reaction of titanium tetrahalide with free ester cannot be negated. Due to use of anhydrous magnesium chloride, additional steps such as spray drying or melting may be required which render the process time consuming. Also the first method demands use of large amounts of titanium reagent, firstly for halogenation of magnesium chloride and then for being supported on the precursor. The use of excess titanium reagent makes the process expensive.

U.S. Pat. No. 4,948,770 describes a process for the preparation of a heterogeneous solid procatalyst comprising titanium compound such as titanium tetrahalide supported on a precursor obtained by reaction of magnesium halide alcoholate formed of anhydrous magnesium chloride and an aliphatic alcohol such as ethanol or isobutanol with anhydrous silica, and an internal electron donor such as an ester.

U.S. Pat. No. 4,535,068 describes a process for the preparation of a heterogeneous solid procatalyst comprising titanium tetrahalide supported on a precursor obtained by halogenation of an organomagnesium compound such as magnesium diethoxide with titanium tetrahalide and an internal electron donor such as an ester in a halohydrocarbon solvent and reacting the resulting halogenated magnesium compound with an acid halide such as benzoyl chloride. Although not specifically stated in the above patent, addition of acid halide is expected to be for the removal of by-products formed during the course of the reaction. In the above process also, since an ester is as such separately added to the reaction mixture containing titanium tetrahalide, there are chances of by-product formation by reaction of ester with titanium tetrahalide. Organomagnesium compounds in the presence of titanium tetrahalide may also result in by-products and affect the performance of the catalyst. This route also employs a two-stage use of titanium reagent and is expensive.

OBJECTS OF INVENTION

An object of the invention is to provide a lower α-alkene polymerisation heterogeneous solid catalyst comprising a hydrated magnesium chloride derived procatalyst which is less expensive.

Another object of the invention is to provide a lower α-alkene polymerisation heterogeneous solid catalyst which comprises a titanium tetrahalide supported on a chemically bonded magnesium chloride ester complex precursor, wherein the internal electron donor ester component of the precursor is generated insitu.

Another object of the invention is to provide a lower α-alkene polymerisation heterogeneous solid catalyst comprising a titanium tetrahalide supported on a chemically bonded magnesium chloride ester complex precursor, wherein the precursor of the procatalyst is synthesised without using an ester because of which generation of by-products is minimised.

Another object of the invention is to provide a lower α-alkene polymerisation heterogeneous solid catalyst comprising a titanium tetrahalide supported on a chemically bonded magnesium chloride ester complex precursor, which when used in polymerisation shows high activity and selectivity and results in polymers with high isotacticity index.

Another object of the invention is to provide a process for the preparation of a lower α-alkene polymerisation heterogeneous solid catalyst comprising a hydrated magnesium chloride derived procatalyst which employs less expensive and readily available reagent viz hydrated magnesium chloride as starting material.

Another object of the invention is to provide a process for the preparation of a lower α-alkene polymerisation heterogeneous solid catalyst which comprises a titanium tetrahalide supported on a chemically bonded magnesium chloride ester complex precursor, wherein the internal electron donor ester component of the precursor is generated insitu.

Another object of the invention is to provide a process for the preparation of a lower α-alkene polymerisation heterogeneous solid catalyst comprising a titanium tetrahalide supported on a chemically bonded magnesium chloride ester complex precursor, wherein the precursor of the procatalyst is synthesised without using an ester because of which generation of by-products is minimised.

Another object of the invention is to provide a process for the preparation of a lower α-alkene polymerisation heterogeneous solid catalyst comprising a titanium tetrahalide supported on a chemically bonded magnesium chloride ester complex precursor, which is less time consuming.

Another object of the invention is to provide a process for the preparation of a lower α-alkene polymerisation heterogeneous solid catalyst comprising a titanium tetrahalide supported on a chemically bonded magnesium chloride ester complex precursor, which when used in polymerisation shows high activity and selectivity and results in polymers with high isotacticity index.

Another object of the invention is to provide a process for a lower α-alkene polymerisation using a heterogeneous solid catalyst comprising a hydrated magnesium chloride derived procatalyst which is less expensive.

Another object of the invention is to provide a process for a lower α-alkene polymerisation using a heterogeneous solid catalyst which comprises a titanium tetrahalide supported on a chemically bonded magnesium chloride ester complex precursor wherein the internal electron donor ester component of the precursor is generated insitu.

Another object of the invention is to provide a process for a lower α-alkene polymerisation using a heterogeneous solid catalyst comprising a titanium tetrahalide supported on a chemically bonded magnesium chloride ester complex precursor wherein the precursor of the procatalyst is synthesised without using an ester because of which generation of by-products is minimised.

Another object of the invention is to provide a process for a lower α-alkene polymerisation using a heterogeneous solid catalyst comprising a titanium tetrahalide supported on a chemically bonded magnesium chloride ester complex precursor, which results in polymers with high isotacticity index.

According to the invention there is provided a lower α-alkene polymerisation heterogeneous solid catalyst comprising:

A) a hydrated magnesium chloride derived procatalyst comprising a titanium tetrahalide supported on a magnesium chloride ester complex precursor, wherein the internal electron donor ester component of the precursor is generated insitu by reaction of a magnesium chloride alcoholate with an activated carbonyl compound in the mole ratio 0.5–1:10–20; wherein the magnesium chloride alcoholate is formed of hydrated magnesium chloride and an aliphatic alcohol in the mole ratio of 0.5–1:10–20;

B) a cocatalyst comprising all organoaluminium compound, the mole ratio of the aluminium to the titanium being 10–300:1; and C) a selectivity control agent comprising an ester or ether in the mole ratio 10–100:1 with respect to the titanium.

According to the invention there is also provided a process for the preparation of a lower α-alkene polymerisation heterogeneous solid catalyst comprising mixing a hydrated magnesium chloride derived procatalyst, a cocatalyst comprising an organoaluminium compound and a selectivity control agent comprising an ester or ether, wherein the procatalyst is obtained by:

i) refluxing hydrated magnesium chloride with an aliphatic alcohol in the mole ratio 0.5–1:10–20 in a hydrocarbon and/or halohydrocarbon solvent followed by dehydration of the reaction mixture;

ii) reaction of the resulting magnesium chloride alcoholate with an activated carbonyl compound in the presence of a hydrocarbon and/or halohydrocarbon solvent in the mole ratio 0.5–1:10–20 at 30–160° C. optionally followed by dehydration of the reaction mixture;

iii) reaction of the resulting magnesium chloride ester complex precursor comprising the internal electron donor ester component generated insitu, with a titanium tetrahalide optionally in tie presence of a hydrocarbon and/or halohydrocarbon solvent at 30–130° C. followed by isolating the resulting procatalyst; the mole ratio of the aluminium to the titanium being 10–300:1 and that of the selectivity control agent to the titanium being 10–100:1.

According to the invention there is also provided a process for a lower α-alkene polymerisation comprising reacting under polymerisation conditions a lower α-alkene with a heterogeneous solid catalyst comprising:

A) a hydrated magnesium chloride derived procatalyst comprising a titanium tetrahalide supported on a magnesium chloride ester complex precursor, wherein the internal electron donor ester component of the precursor is generated insitu by reaction of a magnesium chloride alcoholate with an activated carbonyl compound in the mole ratio 0.5–1:10–20 wherein the magnesium chloride alcoholate is formed of hydrated magnesium chloride and an aliphatic alcohol in the mole ratio of 0.5–1:10–20;

B) a cocatalyst comprising an organoaluminium compound, the mole ratio of the aluminium to the titanium being 10–300:1; and C) a selectivity control agent comprising an ester or ether in the mole ratio 10–100:1 with respect to the titanium.

The lower α-alkene used for polymerisation may be ethylene, propylene, 1-butene and/or 1-hexene to produce homopolymers or copolymers. Preferably propylene is used.

The heterogeneous solid procatalyst may have a surface area of 40–300 m$^2$/g, preferably 50–200 m$^2$/g.

The halide in the titanium tetrahalide may be chloride or bromide, preferably chloride.

Hydrated magnesium chloride used for reaction may be commercially available. The aliphatic alcohol used may be ethanol, propanol, n-butanol, iso-butanol, isopropanol or 2-ethyl hexanol to produce the corresponding magnesium chloride alcoholate. Preferably ethanol, n-butanol or iso-butanol is used. To produce the magnesium chloride alcoholate, hydrated magnesium chloride and aliphatic alcohol are used preferably in the mole ratio 1:10.

The activated carbonyl compound may be that which generates a magnesium chloride ester complex on reaction with a magnesium chloride alcoholate. Preferably the activated carbonyl compound may be an acid halide such as benzoyl chloride, phthaloyl chloride or acetyl chloride, preferably benzoyl chloride or phthaloyl chloride. Alternatively the activated carbonyl compound may be an acid anhydride such as benzoic anhydride, phthalic anhydride or acetic anhydride, preferably benzoic anhydride or phthalic anhydride.

The reaction between the magnesium chloride alcoholate and the activated carbonyl compound may be carried out insitu or following isolation of the magnesium chloride alcoholate. This reaction is carried out preferably at 100–110° C. The mole ratio of the magnesium chloride alcoholate to the activated carbonyl compound is preferably 0.5:10. If the activated carbonyl compound used is an acid anhydride then the reaction mixture is dehydrated following reaction of the magnesium chloride alcoholate and the activated carbonyl compound. Dehydration of the reaction mixture is carried out preferably by azeotropic distillation.

The precursor is reacted with a titanium tetrahalide preferably at 90–120° C.

The hydrocarbon or halohydrocarbon solvent may be aliphatic or aromatic. The hydrocarbon may be toluene, xylene or decane. The halohydrocarbon may be chlorobenzene or dichlorobenzene. Preferably toluene and/or chlorobenzene is used.

The isolation of the procatalyst involves filtration, washing with a hydrocarbon solvent such as toluene and drying of the solid.

The organoaluminium cocatalyst may be trialkyl or mixed halo alkyl or alkoxo alkyl aluminium compounds usually employed with titanium procatalysts. These may be commercially available or prepared in known manner. Preferably triethyl aluminium is used.

Preferably the mole ratio of the aluminium in the cocatalyst to the titanium in the procatalyst of the catalyst is 200:1.

The selectivity control agent is an ester such as p-substituted benzoate or phthalate ester, preferably p-ethoxy ethyl benzoate or an ether such as alkyl alkoxy or aryl alkoxy silane usually employed with titanium procatalysts. Preferably dicyclohexyl dimethoxy silane or diphenyl dimethoxy silane is used. The selectivity control agents may be commercially available or prepared in known manner.

Preferably the mole ratio of the selectivity control agent to the titanium in the procatalyst in the catalyst is 10–75:1.

The components of the polymerisation catalyst viz the procatalyst, cocatalyst and the selectivity control agent may be mixed in a vessel outside the polymerisation reactor before being transferred to the polymerisation reactor. Alternatively the components may be individually transferred into the polymerisation reactor to generate the active catalyst insitu.

The polymerisation may be conducted with one or more lower α-alkenes to produce homopolymers or copolymers, in the gas phase employing one or more fluidised beds of catalyst in known manner. Alternatively the polymerisation may also be conducted in the slurry phase in the absence or presence of an inert hydrocarbon diluent such as hexane in known manner.

According to the invention cheap and readily available hydrated magnesium chloride is used as starting material in the preparation of the procatalyst, instead of organomagnesium compounds or anhydrons magnesium chloride. Besides, during the course of the reaction of magnesium chloride alcoholate with the activated carbonyl compound, the internal electron donor ester component is generated insitu and that too as part of the magnesium chloride ester complex precursor. Therefore there is no free ester available for reaction with titanium tetrahalide and by-product formation is eliminated. Due to use of hydrated magnesium chloride, the process for the preparation of the procatalyst thus eliminates additional steps such as spray drying or melting or use of halogenating agents and consumes titanium reagents only at a single stage in the process for the preparation of the procatalyst. Therefore less amounts of titanium reagents are consumed. This makes the process less expensive and less time consuming. Since the procatalyst is not formed using organomagnesium compounds, further by-products formation is eliminated. The procatalyst prepared by the process of the invention is a chemically bonded one and not a physical mixture of its ingredients. The procatalyst prepared by the process of the invention shows high activity and selectivity, particularly in producing polymers with high isotacticity index.

The following experimental examples are illustrative of the invention but not limitative of the scope thereof.

EXAMPLE 1

Hydrated magnesium chloride (4 g), toluene (200 ml) and isobutanol (12 g) were heated at 109° C. for 24 hrs under continuous azeotropic distillation of water. The liquid was concentrated to separate a white crystalline solid (7.5 g) of magnesium chloride iso-butanolate, which was washed with toluene and then stirred with phthaloyl chloride (10 g) in toluene (200 ml) at 109° C. for 12 hrs to give solid magnesium chloride ester complex precursor. The solid was filtered, washed with chlorobenzene and dried under a flow of nitrogen to give the precursor (3.5 g) having surface area 50–100 m$^2$/g. The precursor was treated with titanium tetrachloride (10 ml) in chlorobenzene (50 ml) at 120° C. for 2 hrs. The heterogeneous solid procatalyst thus obtained was filtered, washed with hexane and dried under a stream of nitrogen.

EXAMPLE 2

Hydrated magnesium chloride (4 g), toluene (200 ml) and ethanol (5 g) were heated at 75° C. for 24 hrs and then at 109° C. for 8 hrs under continuous azeotropic distillation of water. The liquid was concentrated to separate a white crystalline solid (7 g) of magnesium chloride ethanolate, which was washed with toluene and then stirred with benzoyl chloride (8.5 g) in toluene (200 ml) at 110° C. for 12 hrs to give solid magnesium chloride ester complex precursor. The solid was filtered, washed with chlorobenzene and dried under a flow of nitrogen to give the precursor (5 g) having surface area 50–100 m$^2$/g. The precursor was treated with titanium tetrachloride (50 ml) in chlorobenzene (50 ml) at 100° C. for 2 hrs. The heterogeneous solid procatalyst thus obtained was filtered, washed with hexane and dried under a stream of nitrogen.

EXAMPLE 3

Hydrated magnesium chloride (4 g), toluene (200 ml) and n-butanol (12 g) were heated at 109° C. for 24 hrs under continuous azeotropic distillation of water. The rejection mixture was cooled to 60° C. and benzoyl chloride (10 g) was added to the liquid and the mixture stirred magnetically for 12 hours at 110° C. to separate out solid magnesium chloride ester complex precursor. Solid (5 g) which separated out was filtered, washed with chlorobenzene and dried under a flow of nitrogen to give the precursor (3.5 g) having surface area 50–100 m$^2$/g. The precursor was treated with titanium tetrachloride (50 ml) in chlorobenzene (50 ml) at 100° C. for 2 hrs. The heterogeneous solid procatalyst thus obtained was filtered, washed with hexane and dried under a stream of nitrogen.

EXAMPLE 4

Hydrated magnesium chloride (4 g), toluene (200 ml) and isobutanol (12 g) were heated at 109° C. for 24 hrs under continuous azeotropic distillation of water. The liquid was concentrated to separate a white crystalline solid (7.5 g) of magnesium chloride iso-butanolate. This was washed with toluene and then stirred with benzoic anhydride (7.5 g) in toluene (200 ml) at 109° C. for 12 hrs under continuous azeotropic distillation of water to give solid magnesium chloride ester complex precursor. The solid was filtered, washed with chlorobenzene and dried under a flow of nitrogen to give the precursor (5 g) having surface area 50–100 m$^2$/g. The precursor was treated with titanium tetrachloride (10 ml) in chlorobenzene (50 ml) at 100° C. for 2 hrs. The heterogeneous solid procatalyst thus obtained was filtered, washed with hexane and dried under a stream of nitrogen.

EXAMPLES 5 TO 8

Each of the heterogeneous solid procatalysts (0.1 g) of Examples 1 to 4 was mixed with triethyl aluminium cocatalyst (1.425 g) and p-ethoxy ethyl benzoate (0.61 g) as the selectivity control agent. The catalysts were mixed in the proportions such that aluminium:titanium::200:1. The mole ratio of the selectivity control agent to the titanium was 50:1. The catalysts were employed to polymerise propylene in a slurry phase process with hexane as the diluent under a constant pressure of 5 kg for 1 hr at 70° C., followed by addition of 50 mmol of hydrogen to terminate the polymerisation.

EXAMPLES 9 TO 12

The procedure of Examples 5 to 8 were repeated using dicyclohexyl dimethoxy silane (0.15 g) as the selectivity control agent. The mole ratio of the selectivity control agent to the titanium was 10:1.

In all the polymerisations, the activity of the catalysts were 3–7 kg of polymer/g of catalyst/hr and the polymers formed had an isotacticity index not less than 95%.

What is claimed is:

1. A process for the preparation of a lower α-alkene polymerisation heterogeneous solid catalyst comprising mixing a hydrated magnesium chloride derived procatalyst, a cocatalyst comprising an organoaluminium compound and a selectivity control agent comprising an ester or ether, wherein the procatalyst is obtained by:

i) refluxing hydrated magnesium chloride with an aliphatic alcohol in the mole ratio of 0.5–1:10–20 in a hydrocarbon and/or halohydrocarbon solvent to form magnesium chloride alcoholate followed by dehydration of the reaction mixture;
   ii) reaction of the resulting magnesium chloride alcoholate with an activated carbonyl compound in the presence of a hydrocarbon and/or halohydrocarbon solvent in the mole ratio of 0.5–1:10–20 at 30–160° C. to generate insitu an internal electron donor ester component of a magnesium chloride ester complex precursor optionally followed by dehydration of the reaction mixture;
   iii) reaction of the resulting magnesium chloride ester complex precursor comprising the internal electron donor ester component generated insitu, with titanium tetrahalide optionally in the presence of a hydrocarbon and/or hydrocarbon solvent at 30–130° C. followed by isolating the resulting procatalyst; the mole ratio of the aluminium to titanium being 10–300:1 and that of the selectivity control agent to the titanium being 10–100:1.

2. A process as claimed in claim 1, wherein the aliphatic alcohol is ethanol, n-butanol or iso-butanol.

3. A process as claimed in claim 1, wherein the mole ratio of the hydrated magnesium chloride to the aliphatic alcohol is 1:10.

4. A process as claimed in claim 1, wherein the halohydrocarbon is chlorobenzene.

5. A process as claimed in claim 1, wherein the hydrocarbon is toluene.

6. A process as claimed in claim 1, wherein the reaction of the magnesium chloride alcoholate with the activated carbonyl compound is carried out after isolation of the magnesium chloride alcoholate.

7. A process as claimed in claim 1, wherein the dehydration of the reaction mixture is carried out by azeotropic distillation.

8. A process as claimed in claim 1, wherein the activated carbonyl compound is an acid halide.

9. A process as claimed in claim 8, wherein the acid halide is benzoyl chloride or phthaloyl chloride.

10. A process as claimed in claim 1, wherein the activated carbonyl compound is an acid anhydride.

11. A process as claimed in claim 10, wherein the acid anhydride is benzoic anhydride or phthalic anhydride.

12. A process as claimed in claim 1, wherein the reaction of the magnesium chloride alcoholate and the activated carbonyl compound is carried out at 100–110° C.

13. A process as claimed in claim 1, wherein the mole ratio of the magnesium chloride alcoholate to the activated carbonyl compound is 0.5:10.

14. A process as claimed in claim 1, wherein the titanium tetrahalide is titanium tetrachloride.

15. A process as claimed in claim 1, wherein the reaction of the precursor with the titanium tetrahalide is carried out at 90–120° C.

16. A process as claimed in claim 1, wherein the procatalyst is isolated by filtration.

17. A process for the preparation of a lower α-alkene polymerisation heterogeneous solid catalyst comprising mixing a hydrated magnesium chloride derived procatalyst, a cocatalyst and a selectivity control agent, wherein the procatalyst is obtained by:

i) reaction of magnesium chloride alcoholate with an activated carbonyl compound to generate insitu an internal electron donor ester component of a magnesium chloride ester complex precursor; and ii) reaction of the magnesium chloride ester complex precursor comprising the internal electron donor ester component with titanium tetrahalide.

18. A process for a lower α-alkene polymerisation comprising reacting under polymerisation conditions a lower α-alkene with a heterogeneous solid catalyst comprising:

A) a hydrated magnesium chloride derived procatalyst comprising a titanium tetrahalide supported on a magnesium chloride ester complex precursor, wherein an internal electron donor ester component of the precursor is generated insitu by reaction of a magnesium chloride alcoholate with an activated carbonyl compound in the mole ratio of 0.5–1:10–20; wherein the magnesium chloride alcoholate is formed of hydrated magnesium chloride and an aliphatic alcohol in the mole ratio of 0.5–1:10–20;

B) a cocatalyst comprising an organoaluminium compound, the mole ratio of the aluminium to titanium being 10–300:1; and C) a selectivity control agent comprising an ester or ether in the mole ratio of 10–100:1 with respect to the titanium.

19. A process as claimed in claim 18, wherein the titanium tetrahalide is titanium tetrachloride.

20. A process as claimed in claim 18, wherein the aliphatic alcohol is ethanol, n-butanol or iso-butanol.

21. A process as claimed in claim 18, wherein the mole ratio of the hydrated magnesium chloride to the aliphatic alcohol is 1:10.

22. A process as claimed in claim 18, wherein the activated carbonyl compound is an acid halide.

23. A process as claimed in claim 22, wherein the acid halide is benzoyl chloride or phthaloyl chloride.

24. A process as claimed in claim 18, wherein the activated carbonyl compound is an acid anhydride.

25. A process as claimed in claim 24, wherein the acid anhydride is benzoic anhydride or phthalic anhydride.

* * * * *